(12) United States Patent
Piipponen et al.

(10) Patent No.: US 11,419,058 B2
(45) Date of Patent: Aug. 16, 2022

(54) MAXIMUM POWER REDUCTION FOR UPLINK BANDWIDTH PART FOR WIRELESS NETWORKS

(71) Applicant: Nokia Technologies Oy, Espoo (FI)

(72) Inventors: Antti-Veikko Piipponen, Helsinki (FI); Petri Vasenkari, Turku (FI); Vesa Lehtinen, Tampere (FI); Jaakko Marttila, Tampere (FI); Ville Syrjälä, Tampere (FI)

(73) Assignee: Nokia Technologies Oy, Espoo (FI)

( * ) Notice: Subject to any disclaimer, the term of this patent is extended or adjusted under 35 U.S.C. 154(b) by 126 days.

(21) Appl. No.: 16/756,201

(22) PCT Filed: Nov. 6, 2018

(86) PCT No.: PCT/FI2018/050809
§ 371 (c)(1),
(2) Date: Apr. 15, 2020

(87) PCT Pub. No.: WO2019/097116
PCT Pub. Date: May 23, 2019

(65) Prior Publication Data
US 2020/0280926 A1 Sep. 3, 2020

Related U.S. Application Data

(60) Provisional application No. 62/587,220, filed on Nov. 16, 2017.

(51) Int. Cl.
*H04W 52/14* (2009.01)
*H04L 5/00* (2006.01)
(Continued)

(52) U.S. Cl.
CPC ......... *H04W 52/146* (2013.01); *H04L 5/0092* (2013.01); *H04W 52/16* (2013.01); *H04W 52/367* (2013.01)

(58) Field of Classification Search
CPC . H04W 52/146; H04W 52/16; H04W 52/367; H04L 5/0092
See application file for complete search history.

(56) References Cited

U.S. PATENT DOCUMENTS

2010/0255868 A1* 10/2010 Lee ..................... H04W 52/367
455/509
2012/0075989 A1* 3/2012 Roessel ................. H04W 72/04
370/230

(Continued)

FOREIGN PATENT DOCUMENTS

EP 2806595 A1 11/2014
WO 2015/048759 A1 4/2015

OTHER PUBLICATIONS

"Gating Factor Analysis of Maximum Power Reduction in Multicluster LTE-A Uplink Transmission"; Lehtinen et al.; 2013 IEEE Radio and Wireless Symposium; Jan. 20-23, 2013 (Year: 2013).*

(Continued)

*Primary Examiner* — Benjamin H Elliott, IV
(74) *Attorney, Agent, or Firm* — Brake Hughes Bellermann LLP

(57) ABSTRACT

A technique includes controlling uplink transmission power of auser device, wherein a resource block allocation for the user device includes resource blocks in a user device channel bandwidth that is a part of a base station channel bandwidth and the user device channel bandwidth is less than the base station channel bandwidth, wherein the controlling uplink transmission power of the user device comprises reducing a maximum transmission power of the user device for an uplink transmission via the resource block allocation by a maximum power reduction value that is determined based on a distance of the resource block allocation from at least one edge of the base station channel bandwidth.

13 Claims, 11 Drawing Sheets

(51) Int. Cl.
*H04W 52/16* (2009.01)
*H04W 52/36* (2009.01)

(56) References Cited

U.S. PATENT DOCUMENTS

| | | | |
|---|---|---|---|
| 2012/0172081 A1 | 7/2012 | Love et al. | |
| 2012/0236735 A1* | 9/2012 | Nory | H04W 52/367 370/252 |
| 2012/0327866 A1* | 12/2012 | Krishnamurthy | H04W 52/146 370/329 |
| 2013/0182661 A1* | 7/2013 | Piipponen | H04W 52/367 370/329 |
| 2013/0182663 A1* | 7/2013 | Ji | H04W 72/0473 370/329 |
| 2013/0235838 A1* | 9/2013 | Kim | H04W 52/346 370/329 |
| 2013/0310105 A1* | 11/2013 | Sagae | H04W 52/18 455/522 |
| 2014/0126440 A1* | 5/2014 | Frank | H04W 52/367 370/311 |
| 2014/0341126 A1* | 11/2014 | Piipponen | H04L 5/003 370/329 |
| 2015/0011236 A1* | 1/2015 | Kazmi | G01S 5/0226 455/456.1 |
| 2015/0094078 A1* | 4/2015 | Cheadle | H04W 52/146 455/452.1 |
| 2015/0139196 A1* | 5/2015 | Liu | H04W 72/10 370/335 |
| 2015/0271824 A1* | 9/2015 | Zhang | H04W 52/367 370/329 |
| 2016/0037463 A1* | 2/2016 | Siomina | H04W 52/383 370/330 |
| 2016/0302205 A1* | 10/2016 | Ji | H04W 72/0473 |
| 2016/0345298 A1* | 11/2016 | Frank | H04W 52/146 |
| 2016/0353343 A1* | 12/2016 | Rahman | H04W 36/245 |
| 2017/0230919 A1* | 8/2017 | Siomina | H04W 52/383 |
| 2018/0139702 A1* | 5/2018 | Ramkumar | H04W 52/16 |
| 2019/0313348 A1* | 10/2019 | MolavianJazi | H04W 52/44 |
| 2020/0280926 A1* | 9/2020 | Piipponen | H04W 52/16 |

OTHER PUBLICATIONS

"WF on MPR table and allocation definition forsub-6GHz", 3GPP TSG-RAN WG4 NRAH#3, R4-1709944, Skyworks Solutions, Sep. 18-21, 2017, 9 pages.

"TP to TR General Aspects for UE RF for NR Sub-6 GHz—MPR Table and Inner Allocation Definition", 3GPP TSG-RAN WG4 meeting #84bis, R4-1711562, Agenda : 9.4.3.3.1, Skyworks Solutions, Inc., Oct. 9-13, 2017, 15 pages.

"NR range 1 MPR proposal", 3GPP TSG-RAN WG4 Meeting #84bis, R4-1710956, Agenda : 9.4.3.3.2, Nokia, Oct. 9-13, 2017, 5 pages.

"3rd Generation Partnership Project; Technical Specification Group Radio Access Network; NR; User Equipment (UE) radio transmission and reception; Part 1: Range 1 Standalone(Release 15)", 3GPP TS 38.101-1, V0.0.1, Aug. 2017, pp. 1-11.

International Search Report and Written Opinion received for corresponding Patent Cooperation Treaty Application No. PCT/FI2018/050809, dated Dec. 27, 2018, 13 pages.

Extended European Search Report received for corresponding European Patent Application No. 18880025.4, dated Jul. 23, 2021, 16 pages.

* cited by examiner

MAXIMUM POWER REDUCTION FOR UPLINK BANDWIDTH PART FOR WIRELESS NETWORKS

RELATED APPLICATION

This application was originally filed as PCT Application No. PCT/FI2018/050809, filed on Nov. 6, 2018, which claims priority from U.S. Provisional Application No. 62/587,220, filed on Nov. 16, 2017.

CROSS-REFERENCE TO RELATED APPLICATIONS

This application claims priority to United States Provisional Application No. 62/587,220, filed on Nov. 16, 2017, entitled, "MAXIMUM POWER REDUCTION FOR UPLINK BANDWIDTH PART FOR WIRELESS NETWORKS," the disclosure of which is hereby incorporated by reference.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the Long Term Evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. A goal of 5G is to provide significant improvement in wireless performance, which may include new levels of data rate, latency, reliability, and security. 5G NR may also scale to efficiently connect the massive Internet of Things (IoT), and may offer new types of mission-critical services.

Some wireless networks provide for power control in the uplink (UL) transmission directions, in which a base station may control the transmission power of a user device or UE.

SUMMARY

According to an example implementation, a method includes determining, by a user device within a wireless network, a base station channel bandwidth; receiving, by the user device, a resource block allocation including one or more resource blocks in a user device channel bandwidth that are allocated to the user device, the user device channel bandwidth being a bandwidth part of the base station channel bandwidth that is less than the base station channel bandwidth; determining, by the user device, a distance of the resource block allocation from at least one edge of the base station channel bandwidth; and controlling, by the user device based on the distance, a transmission power of the user device for uplink transmission via the resource block allocation.

According to an example implementation, an apparatus includes at least one processor and at least one memory including computer instructions, when executed by the at least one processor, cause the apparatus to: determine, by a user device within a wireless network, a base station channel bandwidth; receive, by the user device, a resource block allocation including one or more resource blocks in a user device channel bandwidth that are allocated to the user device, the user device channel bandwidth being a bandwidth part of the base station channel bandwidth that is less than the base station channel bandwidth; determine, by the user device, a distance of the resource block allocation from at least one edge of the base station channel bandwidth; and control, by the user device based on the distance, a transmission power of the user device for uplink transmission via the resource block allocation.

According to an example implementation, a computer program product includes a computer-readable storage medium and storing executable code that, when executed by at least one data processing apparatus, is configured to cause the at least one data processing apparatus to perform a method including: determining, by a user device within a wireless network, a base station channel bandwidth; receiving, by the user device, a resource block allocation including one or more resource blocks in a user device channel bandwidth that are allocated to the user device, the user device channel bandwidth being a bandwidth part of the base station channel bandwidth that is less than the base station channel bandwidth; determining, by the user device, a distance of the resource block allocation from at least one edge of the base station channel bandwidth; and controlling, by the user device based on the distance, a transmission power of the user device for uplink transmission via the resource block allocation.

According to an example implementation, a method includes controlling uplink transmission power of a user device, wherein a resource block allocation for the user device includes resource blocks in a user device channel bandwidth that is a part of a base station channel bandwidth and the user device channel bandwidth is less than the base station channel bandwidth, wherein the controlling uplink transmission power of the user device comprises reducing a maximum transmission power of the user device for an uplink transmission via the resource block allocation by a maximum power reduction value that is determined based on a distance of the resource block allocation from at least one edge of the base station channel bandwidth.

According to an example implementation, an apparatus includes at least one processor and at least one memory including computer instructions, when executed by the at least one processor, cause the apparatus to: control uplink transmission power of a user device, wherein a resource block allocation for the user device includes resource blocks in a user device channel bandwidth that is a part of a base station channel bandwidth and the user device channel bandwidth is less than the base station channel bandwidth, wherein the controlling uplink transmission power of the user device comprises reducing a maximum transmission power of the user device for an uplink transmission via the resource block allocation by a maximum power reduction value that is determined based on a distance of the resource block allocation from at least one edge of the base station channel bandwidth.

According to an example implementation, a computer program product includes a computer-readable storage medium and storing executable code that, when executed by at least one data processing apparatus, is configured to cause the at least one data processing apparatus to perform a method including: controlling uplink transmission power of a user device, wherein a resource block allocation for the user device includes resource blocks in a user device channel bandwidth that is a part of a base station channel bandwidth and the user device channel bandwidth is less than the base station channel bandwidth, wherein the controlling uplink transmission power of the user device comprises reducing a maximum transmission power of the user device for an uplink transmission via the resource block allocation by a maximum power reduction value that is determined based on a distance of the resource block allocation from at least one edge of the base station channel bandwidth.

The details of one or more examples of implementations are set forth in the accompanying drawings and the description below. Other features will be apparent from the description and drawings, and from the claims.

DETAILED DESCRIPTION

Figure 1:
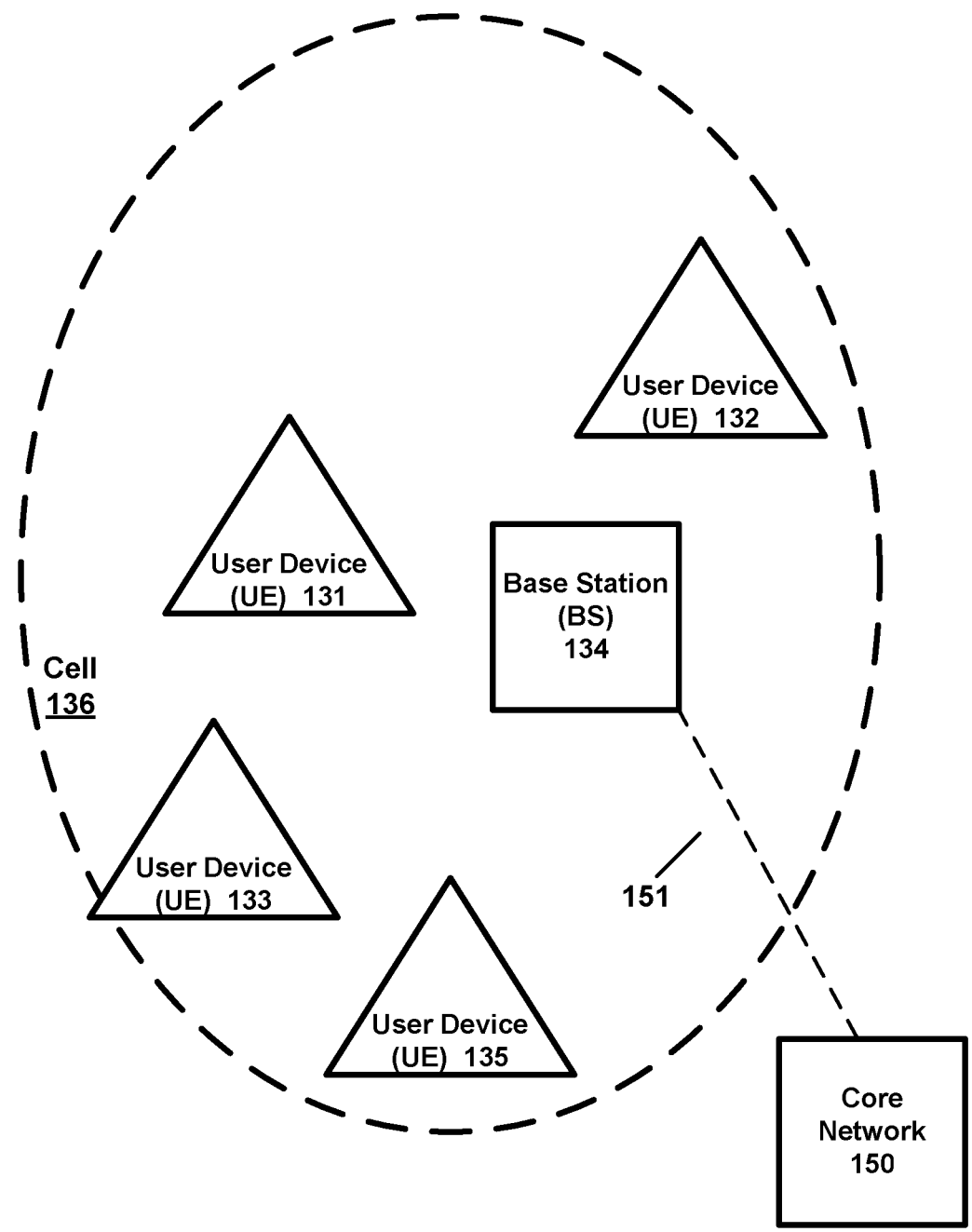
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB, or a network node. At least part of the functionalities of an access point (AP), base station (BS) or (e)Node B (eNB) also may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a Si interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), wireless relaying including self-backhauling, D2D (device-to-device) communications, and ultra-reliable and low-latency communications (URLLC). Scenarios may cover both traditional licensed band operation as well as unlicensed band operation.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability).

The various example implementations may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

Various example implementations relate to power control and Maximum Power Reduction (MPR). According to an example implementation, a power control scheme may be performed between a UE (user device) and a base station (BS). Power control may be used, for example to cause a UE to adjust its uplink transmission power in order for the BS to achieve a minimum signal quality (e.g., signal-to-interference plus noise ratio (SINR)) for received signals from the UE. For example, an open loop or a closed loop power control scheme may be used. A UE may have a maximum transmission power, e.g., 23 dBm, or other power value. A UE may determine its power headroom as a difference between its maximum transmission power and its current transmission power. In some cases, the UE may report its current transmission power, power headroom, and/or maximum transmission power to the BS. In some cases, for example, a UE may use an initial transmission power, and the BS may measure signal quality (e.g., SINR). In an example implementation, a BS may include an uplink grant (or uplink resource allocation) that may include a transmit power control (TPC) command, which may be used to request the UE to increase or decrease its transmission power, e.g., to meet a desired SINR. Power control may also be used to decrease radio interference with other wireless devices and/or to reduce power consumption by the UE. For example, when signal conditions are poor, e.g., due to multi-path fading, a BS may repeatedly request (e.g., via power control commands) the UE to increase its transmission power. Thus, for example, a UE may vary its transmission power within a range up to its maximum transmission power, e.g., based on power control commands from a BS. However, if a UE is already transmitting at its maximum transmission level, this means its power headroom is zero, and the UE is unable to further increase its transmission power.

A maximum power reduction (MPR), or a MPR value, may be a value or an amount that a UE reduces its maximum transmission power. A UE may determine a MPR value, and then may adjust (e.g., decrease) its maximum transmission power by the MPR value, which also decreases its power headroom (e.g., decrease power headroom by the MPR value). The UE may, for example, report to a BS the UE's current transmission power, the UE's (MPR-adjusted) maximum transmission power, and/or the UE's power headroom. Various example implementations may be provided in which a MPR value may be determined and used by a UE to control (e.g., adjust or decrease) its maximum transmission power. In an example implementation, a UE may control its transmission power, e.g., which may include controlling or adjusting its maximum transmission power, e.g., by determining a maximum power reduction (MPR) value for the UE. Thus, a UE may vary its transmission power, e.g., based on BS power control commands, within a power range up to the (MPR-adjusted) maximum transmission power.

According to an example implementation, a technique includes controlling uplink transmission power of a user device, wherein a resource block allocation for the user device includes resource blocks in a user device channel bandwidth that is a part of a base station channel bandwidth and the user device channel bandwidth is less than the base station channel bandwidth, wherein the controlling uplink transmission power of the user device comprises reducing a maximum transmission power of the user device for an uplink transmission via the resource block allocation by a maximum power reduction value that is determined based on a distance of the resource block allocation from at least one edge of the base station channel bandwidth.

According to an example implementation, a UE may receive a resource block allocation within a UE channel bandwidth, where the UE channel bandwidth is a part of a BS channel bandwidth and the UE channel bandwidth is less than the BS channel bandwidth. According to an example implementation, a MPR value and/or a maximum transmission power for a UE may be based on a number of resource blocks for the resource block allocation, a location of the resource block allocation within the BS channel bandwidth (e.g., a distance of the resource block allocation from at least one edge of the BS channel bandwidth), and/or a modulation and coding scheme (modulation rate and coding scheme, MCS) that the UE will use to transmit via the resource block allocation. For example, a UE resource block allocation that is near the edge of the BS channel bandwidth may cause interference to frequencies that are adjacent to the BS channel bandwidth (which may be allocated to other wireless operators and/or other BSs or UEs). On the other hand, a UE resource block allocation that is sufficient far away (e.g., a threshold distance or a threshold number of resource blocks away) from an edge of the BS channel bandwidth will not (or will be less likely to) cause signal interference to frequencies that are adjacent to the BS channel bandwidth. The resource block size and/or MCS may also impact the maximum transmission power (and, thus, MPR value) that may be used by the UE. Thus, according to an example implementation, a UE and/or BS may determine a MPR value (and thus, determine a MPR-adjusted maximum transmission power) for the UE based on, e.g., a MCS used by the UE for uplink transmission, a size of the resource block allocation and/or a distance of the resource block allocation from at least one edge of the BS channel bandwidth.

Thus, for example, a technique may be provided for power control for a user device, including determining, by a user device within a wireless network, a base station channel bandwidth; determining, by the user device, a resource block allocation including one or more resource blocks in a user device channel bandwidth that are allocated to the user device, the user device channel bandwidth being a bandwidth part of the base station channel bandwidth that is less than the base station channel bandwidth; determining, by the user device, a distance of the resource block allocation from at least one edge of the base station channel bandwidth; and, controlling, by the user device based on the distance, a transmission power of the user device for uplink transmission via the resource block allocation.

According to an illustrative example implementation, the controlling may include selecting, by the user device based on the distance, a maximum power reduction value as either: 1) a first maximum power reduction value if the distance of the resource block allocation from at least one edge of the base station channel bandwidth is greater than or equal to a threshold, or 2) a second maximum power reduction value if the distance of the resource block allocation from at least one edge of the base station channel bandwidth is less than the threshold; determining a maximum transmission power based on the selected maximum power reduction value; and controlling, by the user device, the transmission power of the user device for uplink transmission within a power range that is less than or equal to the maximum transmission power. Further illustrative details will now be described according to various example implementations.

According to an example implementation, a UE (user device) channel bandwidth may be, for example, either: the same bandwidth as a BS channel bandwidth, or the UE channel bandwidth may be less than the BS channel bandwidth. According to an example implementation, if a UE channel bandwidth is the same as the BS channel bandwidth, a maximum power reduction (MPR) value may be selected from a first (e.g., standard) set of MPR values, e.g., based on UE channel bandwidth and UE modulation and coding scheme (MCS)/modulation rate. Note that in the standard set of MPR values, MPR values are not selected based on a location of a UE channel bandwidth within the BS channel bandwidth, since the UE channel bandwidth is the same as the BS channel bandwidth. In addition, according to an example implementation, if a UE channel bandwidth is less than the BS channel bandwidth, then a maximum power reduction (MPR) value may be selected or determined from a second (or modified) set of MPR values, based on, e.g., UE channel bandwidth, UE modulation and coding scheme (MCS) or UE modulation rate, and the location of the UE channel bandwidth (or location of the UE resource block allocation within the UE channel bandwidth) within the BS channel bandwidth. For example, in-band (within the BS channel bandwidth) channel emissions may be less strict than out-of-band (just outside the BS channel bandwidth) channel emissions. As a result, a UE resource block allocation for a UE channel bandwidth that is less than the BS channel bandwidth, and if not too close to the edge of the BS channel bandwidth (e.g., or at least a threshold distance away from an edge of the BS channel bandwidth), may use a greater maximum transmission power (e.g., because the in-band emissions requirements applicable within the BS channel bandwidth are less strict than out-of-band emissions requirements), which corresponds to a smaller MPR value. Further illustrative examples will now be provided. Thus, for example, in the case where a UE channel bandwidth (and the UE resource block allocation) is less than the BS channel bandwidth, then a MPR value (used to decrease a UE maximum transmission power) for the UE may be determined based on a distance of the UE resource block allocation from at least one edge of the base station channel bandwidth.

According to an example implementation, a BS may have a channel bandwidth that is larger than a UE bandwidth part for uplink (UL) bandwidth (BW). For example, a BS may have a 60 MHz UL BW, and a UE may be assigned a 20 MHz UL bandwidth part. These are example numbers that are used for illustrative purposes and other bandwidths may be used.

On the other hand, in the case where a UE channel bandwidth is the same as BS channel bandwidth, when RF requirements are defined for uplink transmission, the nominal uplink channel bandwidth is considered. Out-of-band emission requirements apply immediately outside the channel bandwidth, as the spectrum may typically be licensed to another operator, or may have some other services deployed.

Figure 2:
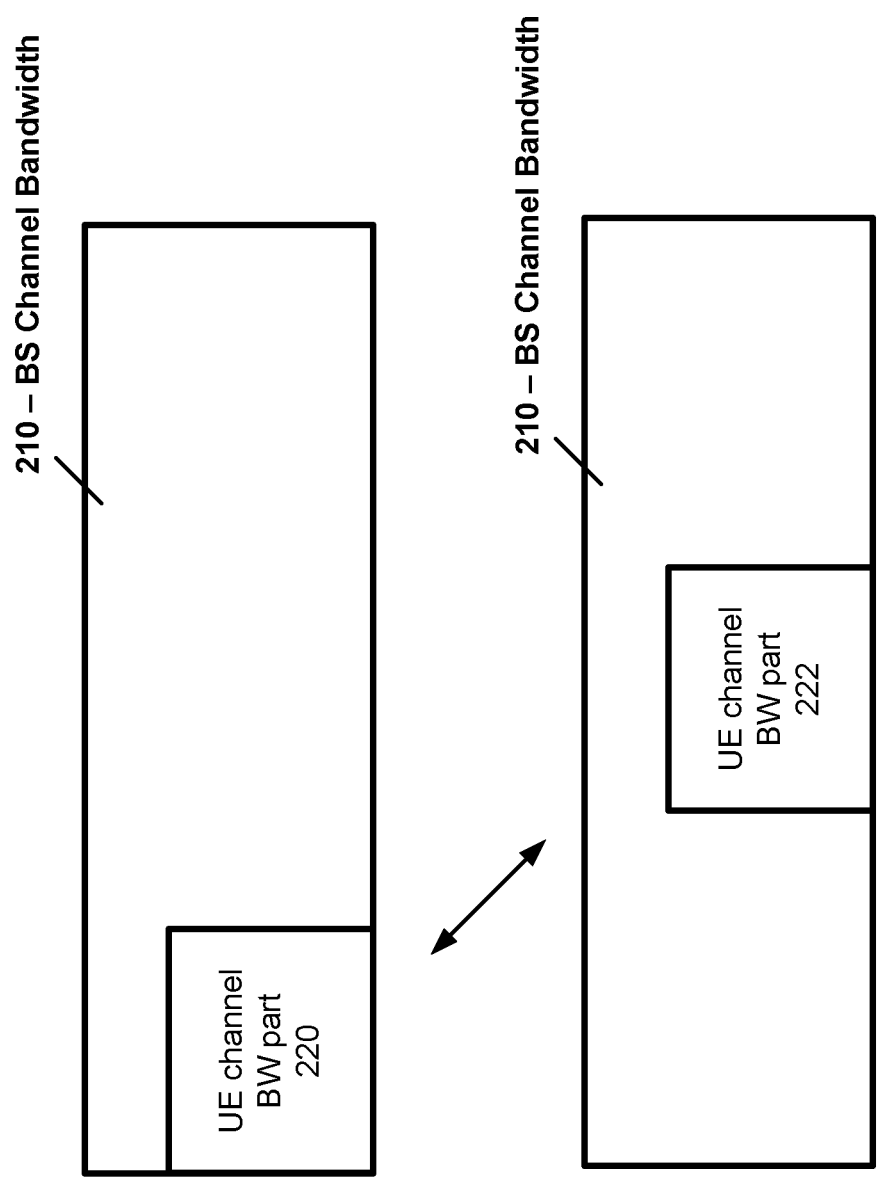
FIG. 2 is a diagram illustrating a wide base station channel bandwidth 210, and a narrower UE channel bandwidth for uplink transmission according to an example implementation.

FIG. 2 is a diagram illustrating a wide base station channel bandwidth 210, and a narrower UE channel bandwidth for uplink transmission according to an example implementation. In an illustrative example implementation, out-of-band channel emissions requirements apply to frequencies just outside of the wide BS channel bandwidth 210. However, less strict in-band channel emissions requirements apply within the BS channel bandwidth 210. Thus, for example UE channel bandwidth part 220 is located at or near an edge or the BS channel bandwidth 210. As a result, emissions from a UE transmission via resources allocated within the UE channel bandwidth part 220 may be subject to the strict out-of-band emissions requirements (e.g., thus, possibly requiring a greater MPR value, resulting in a lower maximum transmission power). On the other hand, UE channel bandwidth part 222 is not located near an edge (e.g., UE channel bandwidth part 222 is located at least a threshold distance away from the edge) of the BS channel bandwidth 210. As a result, the less strict in-band emissions requirements apply (e.g., but the stricter out-of-band emissions requirements do not apply) to an uplink transmission by a UE within the UE channel bandwidth part 222, which may allow a greater maximum transmission power (and thus, smaller MPR) for UE channel bandwidth part 222. This is because frequencies immediately outside of UE channel bandwidth part 222 may be considered in-band, and thus subject to the less strict in-band emissions requirements. Thus, when the UE is using a UE channel bandwidth part for UL transmission that is smaller than the BS channel bandwidth, a different set of MPR values may be used, including MPR values that may be less or lower (to allow a greater maximum transmission power) for UE resource allocation blocks that are at least a threshold distance away from an edge of the BS channel bandwidth.

In an illustrative example, MPR is a concept that may allow relaxation (or reduction) in UE uplink maximum transmission power, if the transmitted signal is "difficult" or challenging from emissions viewpoint, such as for certain modulation rates or MCS, and/or for certain sizes of UE resource blocks. For instance, 16-QAM (quadrature amplitude modulation) modulation may be considered more difficult than QPSK (quadrature phased shift keying). If the transmit chain and power amplifier (PA) of the UE can output the maximum rated power when the signal is QPSK modulated, the same output power would be more difficult to achieve with 16-QAM due to increased emissions. Also, for example, in some cases, a maximum output power for 16-QAM signal may be allowed to be slightly lower than for QPSK, in order not to increase the transmitter linearity requirements. MPR is the amount of relaxation (or reduction) in transmission power, typically expressed in decibels (e.g., dB or dBm).

According to an example implementation, a nominal power output (or transmission power) from a UE may be 23 dBm, and a MPR may reduce this maximum transmission power by a MPR value, e.g., 1 dB, 2 dB, etc. For example, a larger MPR value may be used to accommodate a more difficult modulation rate or scheme (MCS), e.g., since in some cases, transmitting at full 23 dBm for some modulation schemes may require UE component performance (e.g., a more linear PA) that may not be available, or may not be available without increasing emissions.

A maximum output (or maximum transmission) power may, for example, depend not only on the used modulation (modulation scheme), but also the number of allocated resource blocks (UE channel BW size), and their position/location inside the channel. In an illustrative example, some limiting factors may include spectrum emission mask (SEM) and spurious emission mask that apply outside the transmit channel, adjacent channel power leakage ratio (ACLR), in-band emissions, and Error Vector Magnitude (EVM) (e.g., transmit signal modulation quality). For example:

SEM, for example, typically limits the resource allocations close to the channel edge, because the spectrum utilization in NR is much higher than in LTE and the guard bands at channel edges are smaller.

Also, for example, a spurious emission mask is typically not limiting with contiguous resource allocation, but can become limiting with non-contiguous allocation or when multiple carriers are aggregated.

ACLR (adjacent channel leakage ratio—an amount that leaks to adjacent channels) may typically limit large resource allocations, as in these cases the spectral regrowth extends well beyond the guard band and to the ACLR measurement bandwidth. For example, spectral regrowth may be or may include unwanted frequency expansion of transmitted signal bandwidth due to non-linear distortion in the power amplifier. The ideal baseband signal has little power outside the transmitted resource blocks, whereas the non-linear behavior of the transmit chain (mainly the PA) cause significant leakage of power outside the transmitted resource blocks.

EVM may, for example, be a limiting case for high modulation depth signals, as the signal quality must be good. Low modulation indexes allow significantly higher EVM, hence not limiting. Modulation depth or index may refer to how much information is encoded to a single symbol. The higher the amount of info, the better the transmit signal quality must be (i.e. needs smaller Error Vector Magnitude). Due to the non-linear behavior of the transmit chain, the signal quality degrades more as the output power get closer to the maximum. All the other requirements discussed in this section may typically relate to unwanted emissions; if there were no other users of the radio spectrum, the transmit power would be limited only by the signal quality requirement, as the unwanted emissions would not matter. It turns out that the output power for BPSK, QPSK, 16-QAM, and 64-QAM is typically unwanted emissions limited (in-band or out-of-band depending on the distance to channel edge), but for 256-QAM (and higher) EVM may typically be the limit, according to an illustrative example.

In-band emission mask typically limits allocations that are not close to the edge of the channel. In some cases, the smallest MPR values (and thus, higher maximum transmission power) are obtained when in-band mask is the limiting factor, or EVM in case of very narrow band allocations.

In LTE, the UE and BS channel BW are the same width. According to an example implementation, in NR, BS channel BW may be larger than UE channel BW. And, for example, in-band emission (within the BS channel BW) limits are not as strict as out-of-band emissions limits (emissions to frequencies that are outside of the BS channel BW) and spurious emissions limits.

Figure 3:
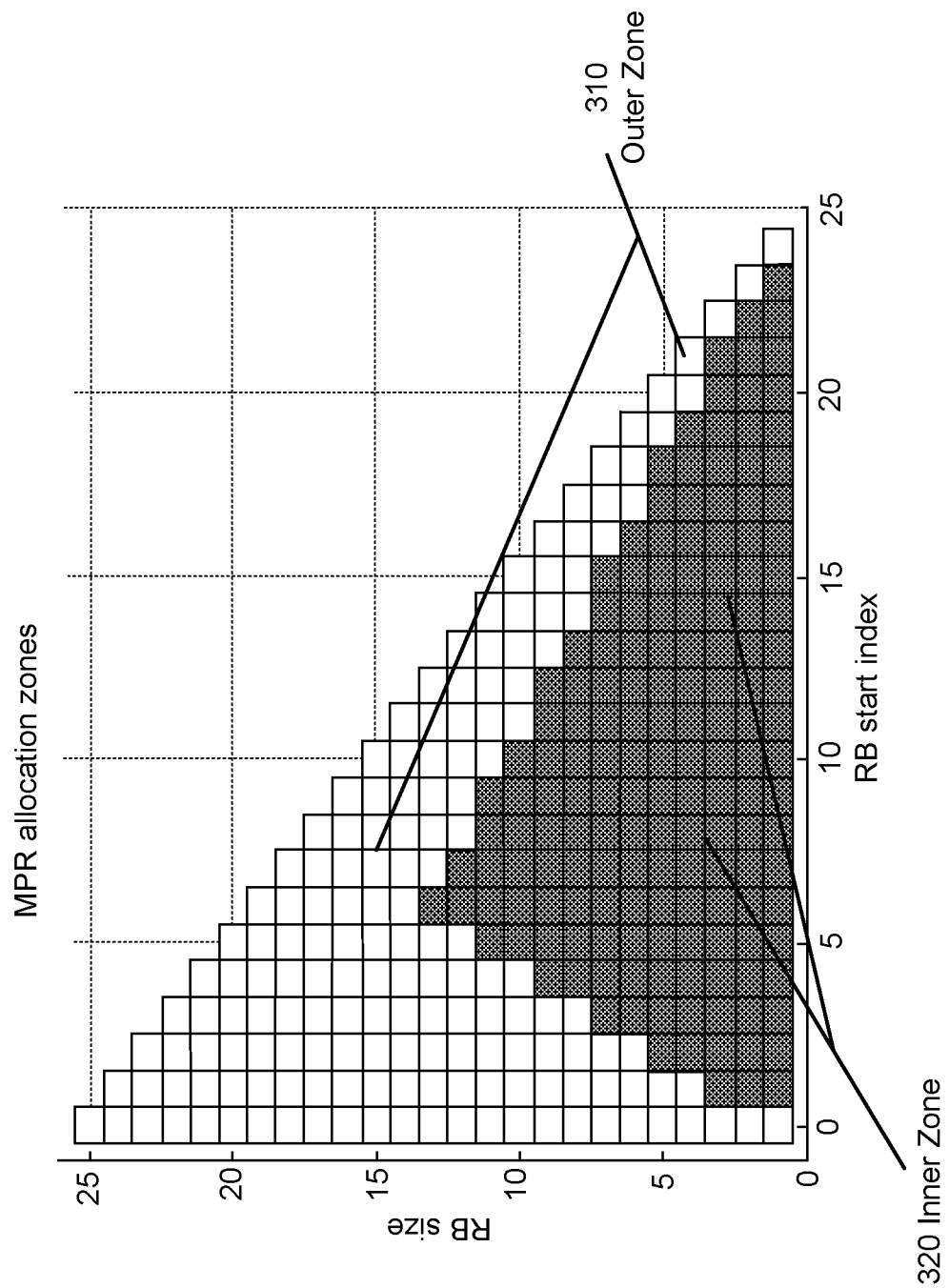
FIG. 3 is a diagram illustrating MPR allocation zones, including inner and outer zones for MPR according to an example implementation.

FIG. 3 is a diagram illustrating MPR allocation zones, including inner and outer zones for MPR according to an example implementation. According to an example implementation of MPR, UE resource block allocations for UL transmission may be divided into "inner" and "outer" zones, depending on if the allocation is close to the channel edge (an "outer" zone 310), or clearly inside the channel (an "inner" zone 320). For 5 MHz (25 resource blocks, indexes from 0 to 24) channel bandwidth, the zones can be illustrated as in FIG. 3. The y-axis is the UE RB (resource block) allocation size, and x-axis the start position of the UE resource block allocation. An allocation of size 25 RBs must start at index 0; an allocation of size 1 can start at any index from 0 to 24; these boundaries form a triangle shape, as shown in FIG. 3.

In the illustrative example of FIG. 3, a UE channel BW is 25 RBs. ABS channel BW might be 100 RBs (or could be hundreds). 25 RBs may be approximately 180 KHz in width in LTE and NR uses same. For a given UE could have a resource allocation in UL for any of these 25 RBs, and BS would send the UE a resource allocation, e.g., which may indicate a starting RB index and a length of RB allocation. According to an example implementation, MPR values may be provided to take advantage of a case where a UE channel BW is less than the BS channel BW, and, e.g., where a UE RB allocation, within the UE channel BW, is within a threshold distance of an edge of the BS channel BW. In such a case, the less restrictive in-band emissions limits may be applicable, which may allow for a lower MPR (and thus, allow for a higher/greater maximum transmission power for transmissions via such resource block allocations). For example, a higher MPR value (e.g., 3 dB) (corresponding to a lower maximum transmission power output) may be assigned to UL resource allocations within the outer zone (near edges of BS BW), where out-of-band emissions limits are more restrictive. A smaller MPR value (e.g., 0 dB) may be assigned inner zone 320, while a larger MPR value (e.g., 3 dB) may be used for outer zone 310, for example. As noted, this may allow, at least in some cases, for a higher/greater maximum transmission power (due to a lower/smaller MPR) for transmissions via resource block allocations within an inner zone 320 or for RB allocations that are at least a threshold distance away from an edge of the BS channel BW.

According to an illustrative example implementation, if a UE operates on a bandwidth part within a larger base station channel bandwidth, for the purposes of MPR calculation, when determining whether an RB allocation is "inner" or "outer", the edges of the channel, for example, may be considered to be the larger base station channel bandwidth edges, instead of the UE's bandwidth part edges. Thus, the location (e.g., center frequency or edge frequencies) of the UE channel BW may be compared to the edges (e.g., edge RB indexes) to determine if the UE resource block allocation is an inner or outer zone allocation, for example. While only two zones are shown for MPR calculation, any number of allocation zones may be used, e.g., 2, 3, 4, . . . . In an illustrative example implementation, for one or more modulation rates or MCS, a different MPR value may be used or indicated, depending on whether the UE RB allocation is within the inner zone 320 or outer zone 310. This enlarges the space of inner allocations, improving UE UL transmission power (based on a lower/smaller MPR value) in cases where it is known that the out-of-band emission requirements do not apply (e.g., for inner zone UE RB allocations).

According to an example implementation, a UE that is operating on a bandwidth part within the larger base station bandwidth, determines whether to apply a standard set of MPR values (e.g., in the case where the UE has the same channel bandwidth as the BS channel BW, or where the UE is unable to determine that its channel BW is less than the BS channel BW), or a modified set of MPR values (e.g., in the case the UE determines that the UE channel BW is less than the BS channel BW). In an example implementation, the UE may receive one or more parameters to allow it to determine whether its UE channel BW is less than the BS channel BW, and then determine a location of the UE channel BW with respect to the edges of the BS channel BW, based on UE-specific signaling from the base station, e.g., received via initial access or Random access, or based on information broadcasted by the base station via system information block (SIB), for example. Both the UE and the BS may apply the same (or a similar) method when determining or calculating the MPR for the UE. The UE determines the MPR value, so it can adjust its maximum transmission power and associated power headroom, and the base station needs to know the UE MPR value, e.g., in order to correctly use the power headroom reports from the UE.

Figure 4:
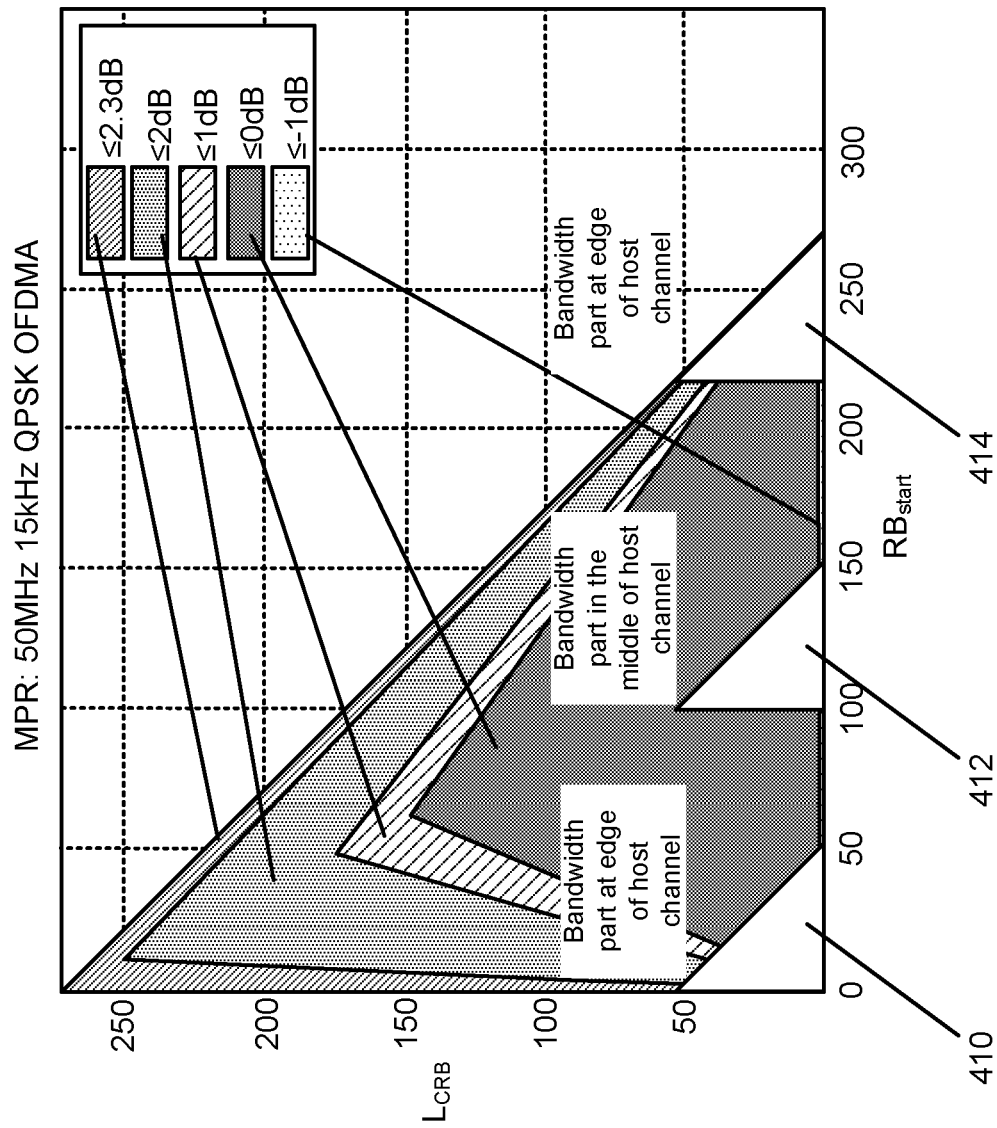
FIG. 4 is a diagram illustrating a simulated MPR according to an example implementation.

FIG. 4 is a diagram illustrating a simulated MPR for CP-OFDM in 50 MHz channel according to an example implementation, based on simulation, for an example 50 MHz channel bandwidth using 15 kHz subcarrier spacing and QPSK modulation. It can be easily seen that all the inner allocations can be transmitted at 0 dB MPR, and the outer allocations need up to 2.3 dB MPR. While a 2.3 dB is a MPR value for outer allocations, this MPR value (for outer zone allocations) may be, for example, (e.g., rounded up to) 3 dB. LCRB is length of contiguous resource block allocation to UE. Thus, FIG. 4 illustrates a simulated MPR for CP-OFDM in 50 MHz channel (left).

Figure 5:
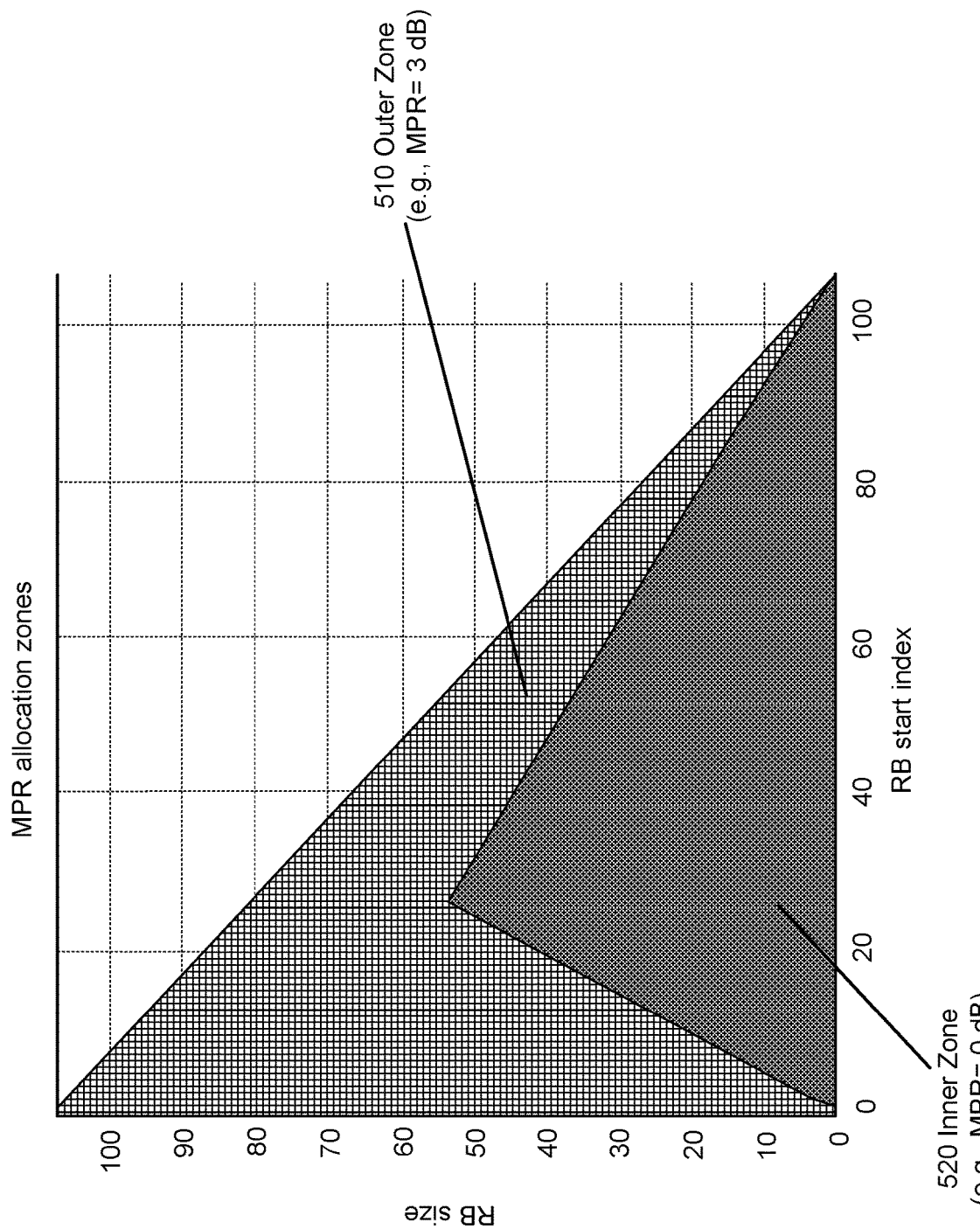
FIG. 5 is a diagram illustrating corresponding MPR inner zone and outer zone, which may correspond to FIG. 4, according to an example implementation.

FIG. 5 is a diagram illustrating corresponding MPR inner zone 510 and outer zone 520, corresponding to FIG. 4. Thus, for example, the 0 dB and −1 dB areas of FIG. 4 fall within the inner zone 520 of FIG. 5, and the other dB areas of FIG. 4 fall within outer zone 510. FIG. 4 may be considered raw data from simulations with multiple MPR (1, 2 or 3 dB values are grouped as 3 dB values as the outer zone 510 of FIG. 5); and 0 or −1 dB values from FIG. 4 would be mapped to 0 dB as inner zone 520 of FIG. 5. Also, FIG. 4 illustrates example 10 MHz UE channel bandwidths 410, 412, and 414 (which are less than the BS channel BW) within a BS channel bandwidth. For example, UE channel BWs 410 and 414 are near edges of BS channel BW, and thus, may be within outer zone 510 (e.g., mapped to 3 dB MPR value), while UE channel BW 412 is not near edges of BS channel BW, and thus, is within inner zone 520 (e.g., mapped to a 0 dB MPR value), for example.

Figure 6:
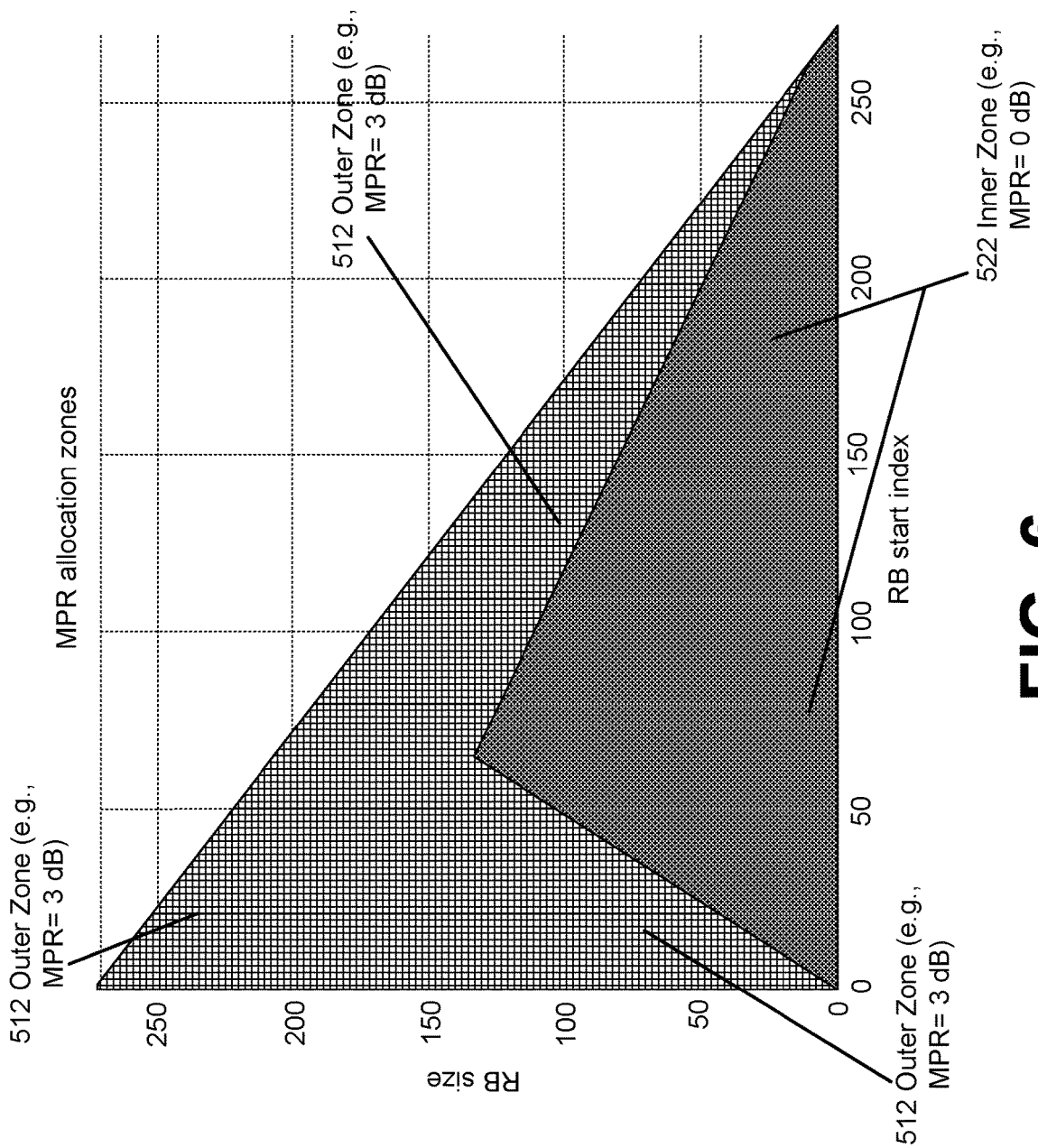
FIG. 6 is another diagram illustrating corresponding MPR inner zone and outer zone, which may also correspond to FIG. 4, according to another example implementation.

FIG. 6 is a diagram illustrating corresponding MPR inner zone and outer zone according to another example implementation, which may also correspond to FIG. 4. An outer zone 512 (e.g., mapped to 3 dB) and an inner zone 522 (e.g., mapped to 0 dB or other MPR value that is less than the MPR value for the outer zone) are shown.

The shape is similar for all channel bandwidths and numerologies (subcarrier spacings). The MPR values differ mainly due to subcarrier modulation, and if DFT spreading is used or not.

TABLE 1

Modified MPR values according to an illustrative example implementation (e.g., to be applied when UE channel BW (bandwidth) is less than BS channel BW).

| Allocation type | | Outer (max MPR) | Inner (min MPR) |
|---|---|---|---|
| LCRB (length of contiguous RB | | all | ≤LCRBmax/2 |
| Distance from BS channel BW edge | | <LCRB/2 from edge | ≥LCRB/2 from edge |
| WF type | modulation | MPR For all BW and SCS | |
| DFT-s-OFDM | PI/2 BPSK | 0 | 0 |
| | QPSK | 1 | 0 |
| | 16QAM | 1.5 | 0.5 |
| | 64QAM | 2 | |

TABLE 1-continued

Modified MPR values according to an illustrative example implementation (e.g., to be applied when UE channel BW (bandwidth) is less than BS channel BW).

| Allocation type | | Outer (max MPR) | Inner (min MPR) |
|---|---|---|---|
| | 256QAM | 5 | |
| CP-OFDM | QPSK | 3 | 0.5 |
| | 16QAM | 3 | 1.5 |
| | 64QAM | 3 | |
| | 256QAM | 7 | |

Table 1 indicates MPR values for inner zone and outer zone for (e.g., for frequency bands below 6 GHz) based on modulation scheme and distance of UE channel BW from BS channel BW edge. LCRB refers to length of continuous resource block allocation for UE (UE RB allocation size/length). As shown in the example set of modified MPR values in Table 1, for QPSK (for DFT-s-OFDM), a MPR value of 1 dB is provided if the UE channel BW is less than LCRB/2 from BS channel BW edge, and a MPR value of 0 dB is provided if the UE channel BW is greater than or equal to LCRB/2 from an edge of the BS channel BW. Different MPR values are provided for QPSK and 16 QAM for both DFT and CP-OFDM, based on the location of the UE channel BW within the BS channel BW (based on a distance of the UE channel BW from an edge of the BS channel BW). On the other hand, other modulation schemes have only one MPR value, regardless of the distance of the UE channel BW from an edge of the BS channel BW. In this manner, in the case where a UE channel BW is smaller than the BS channel BW (thus, indicating that the Table 1 may be applied to determine MPR values), a lower MPR (and thus, higher maximum transmission power) may be used for at least some modulation rates/schemes if the UE channel BW is at least a threshold (e.g., LCRB/2 in this example) from an edge of the BS channel BW.

According to an example implementation, a channel edge may, for example, refer to a channel edge of BS: 52 RB UE channel BW (i.e., 10 MHz) within 270 RB BS RB channel BW (i.e., 50 MHz), for example. For example, see FIG. 4 and FIG. 6. Outer zone and Inner zone designation (which may be mapped to or indicate MPR values to be used by UE) is calculated: UE knows LCRB—length of RB allocation. In an illustrative example, a UE determines distance (e.g., number of RBs) from an edge of the resource allocation inside the UE channel BW to a closest edge of the BS channel BW. UE determines relative location of both edges of its UE channel BW as compared to edges of BS channel BW (either to a same edge of BS channel BW, or to its closest edge, as examples).

For 64QAM and 256 QAM, MPR is same for inner zone and outer zone, for example, because in-channel emissions are more stringent than out-of-band requirements, so the modified set of MPR values (providing lower MPR for some UE channel bandwidths) cannot be applied to these two modulation schemes/rates.

Example implementations may relate to selecting a MPR for a UE channel BW based on a size of the UE channel BW and its relative location of the UE channel BW with respect to the edges of the BS channel BW. Also, example implementations may relate to changing the definition of the uplink channel edges in bandwidth part operation, from the nominal uplink channel edges e.g., of UE BW to the wider base station bandwidth edges. This is possible, because from system and regulatory point of view, the uplink transmissions must fulfil the out-of-band emission limits of the total (wide) BS channel bandwidth, and any unwanted emissions that are confined within the wide base station channel bandwidth, are considered in-band (and only impact the operator's own network).

As already mentioned, it might be best to use the MPR rule of the bandwidth of the base station channel bandwidth directly. The UE may need to know the base station channel bandwidth and the position of the UE's bandwidth part in the base station channel.

The following is an illustrative example for determining inner and outer zones, and for determining whether a location of a UE channel BW is within inner or outer zone, for example.

LCRB (Length of Contiguous RB): UE RB allocation size.

LCRBmax: total number of RBs in base station channel bandwidth (BS channel BW).

RBstartlow=LCRB/2 rounded down to next integer with floor at 1.

RBstarthigh=LCRBmax−RBstartlow−LCRB.

RBstart0=index of lowest RB of the bandwidth part assigned to the UE, in the coordinates of the base station channel bandwidth (UE specific).

Inner Allocation:

RBstartlow≤RBstart0+RBstart≤Rbstarthigh.

Outer allocation: the rest of allocations.

If BW part assigned to UE (which may typically be a bandwidth of one of the possible UE channel BWs, e.g., 5, 10, 15, 20 MHz) is less than BS channel BW, then the modified set of MPR values may be used to determine the MPR value, and take advantage of the lower emissions requirements for in-band emissions, and allow a higher transmission power for some UE channel BWs that are not near the BS channel BW edge, for example.

Formula above is written such that the lower edge of lowest RB index of LCRB must be less than or equal to RBstarthigh, as an illustrative example implementation.

In another example implementation, RBstart0 might be derived from other information (rather than explicitly provided; BS may still provide LCRBmax); Synchronization Blocks (or Synchronization signal blocks) can be used by UE, and may include carrier offset information (e.g., indicating carrier location for Random access carrier), where to perform random access, and UE channel BW or UE assigned RBs for access. Thus, UE might derive or determine the RBstart0 from other information that is provided.

Another example implementation in this case is to re-formulate or provide the rules for inner and outer zone allocations as follows:

Illustrative Example

Base station provides to the UE during initial access or random access:

LCRBmax of the base station: 100 Total number of Resource Blocks in the base station bandwidth.

LCRBmax of the UE's BW part: 25 Total number of Resource Blocks in the UE channel bandwidth.

RBstart0 of the UE's BW part: 20 Lowest Resource Block index of the UE bandwidth part inside the base station bandwidth.

Base station provides to the UE per each uplink transmission:

LCRB: 15 Length of contiguous resource block allocation, must be ≤LCRBmax of UE.

RBstart: 0 Start index of the contiguous resource block allocation (in UE's own indexing i.e. from 0 to LCRBmax of UE).

Calculation per resource allocation:

RBstartlow: 7=LCRB/2 rounded down to next integer with floor at 1.

RBstarthigh: 78=LCRBmax-RBstartlow-LCRB.

Inner zone allocation: Yes (RBstartlow≤RBstart0+RBstart≤RBstarthigh).

Outer zone allocation: No (Other allocations).

Figure 7:
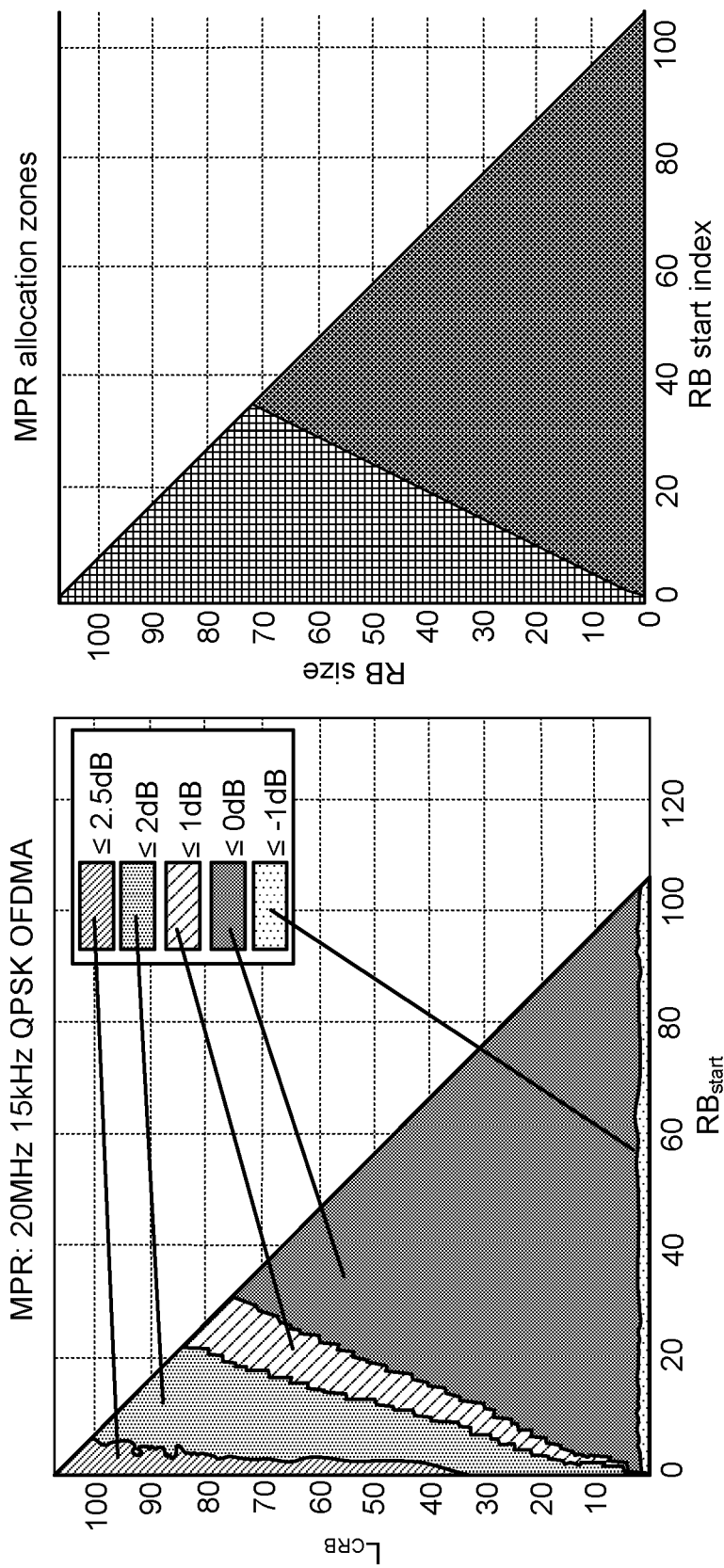
FIG. 7 are diagrams illustrating the simulated MPR values according to an example implementation.

FIG. 7 are diagrams illustrating the simulated MPR values in a scenario where only the lower side out-of-band emission mask and ACLR are evaluated. On the right hand side we show the corresponding inner and outer allocation zones according to an example implementation.

An example implementation in this case (FIG. 7) may be to re-formulate the rules for inner and outer allocations as follows:

LCRB: RB allocation size (UE channel BW).

LCRBmax: maximum RB allocation size (i.e. total number of RBs in BS channel bandwidth).

RBstartlow=LCRB/2 rounded down to next integer with floor at 1 (lower edge of UE channel BW).

RBstarthigh=LCRBmax-RBstartlow-LCRB (represents upper edge of UE channel BW).

Inner allocation for bandwidth part scenario with out-of-band requirements applying only on low side of the channel:

RBstartlow≤RBstart.

Outer allocation: the rest of allocations.

Correspondingly, if the bandwidth part is allocated at the high edge of the wide base station channel, inner allocations are: RBstart≤RBstarthigh. If the bandwidth part is in the middle of the wide base station channel, all allocations can be considered inner allocations.

Another possible implementation is to directly use the MPR definition of the larger base station channel bandwidth, for the UE using the bandwidth part. For instance, a 20 MHz channel has 106 RB at 15 kHz spacing, and a 50 MHz channel has 270 RB. Instead of using the normal 0 . . . 105 RB indexing and 20 MHz equations, the 20 MHz UE uses 106 consecutive RB indexes of the range 0 . . . 269 (the exact position depending on which part has been assigned), and the 50 MHz equations.

Yet another possible implementation is to revise the Equation 1 to use absolute frequencies for the channel edges and inner allocation start and stop frequencies. The edge frequencies for the equation are selected based on the base station channel bandwidth the UE operates in. Another possibility for this is to use frequency offsets instead of absolute frequencies.

To use any of the MPR zone changes or the changed equations when operating inside a larger base station channel bandwidth, some further info is needed. Normally, the UE will not know the base station channel bandwidth, it just uses the allocated bandwidth part without knowledge of the adjacent frequencies. When the UE is informed about the bandwidth part it shall use, it could also be informed about some of the channel edges and which MPR zone equation to use; this info can be cell and UE specific. The base station could also broadcast its channel edge frequencies in system information (e.g. SIB2), and each UE would then determine the MPR zone equations based on the allocated bandwidth part.

Figure 8:
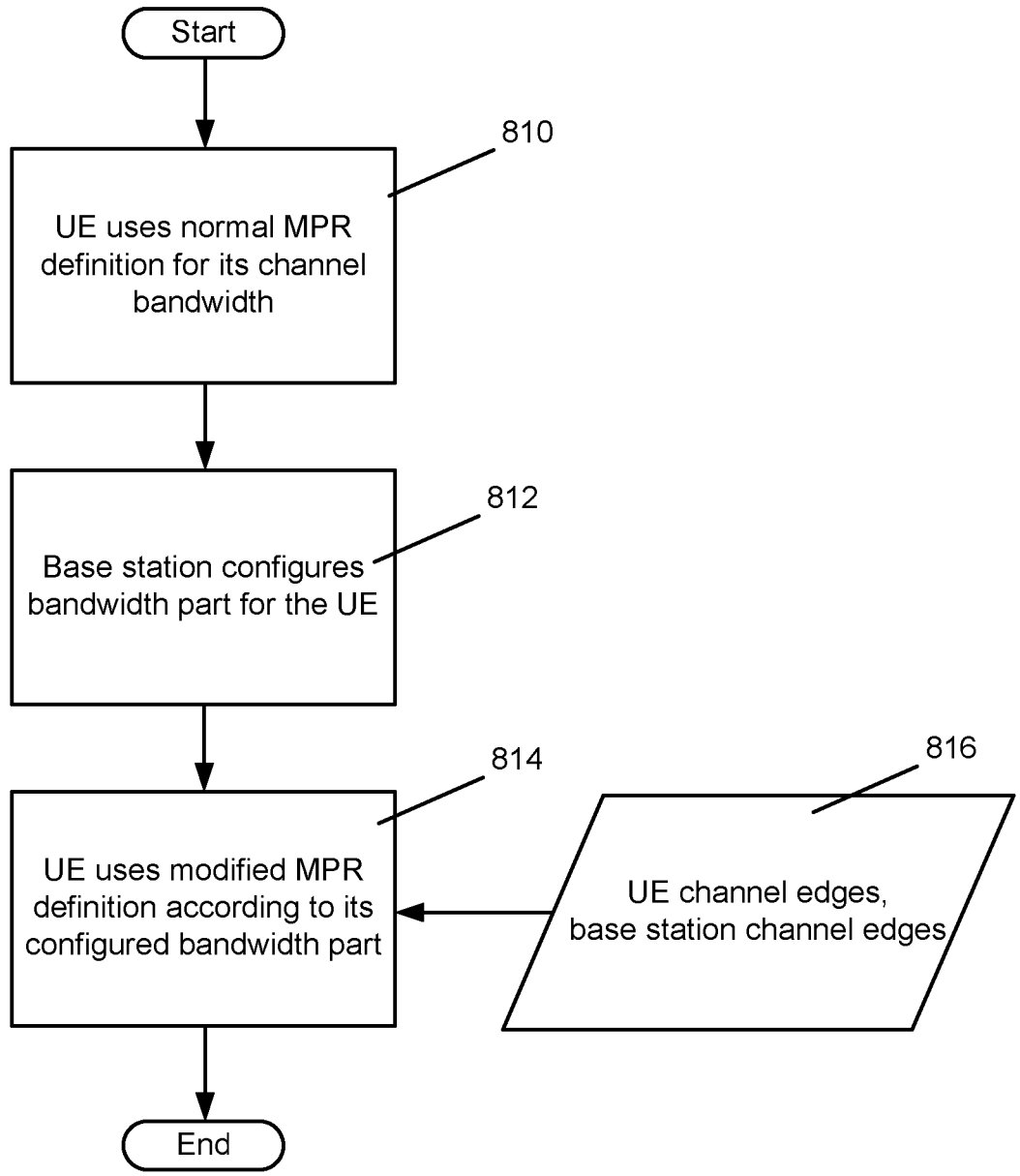
FIG. 8 is a flow chart illustrating operation of a user device/UE according to an example implementation.

FIG. 8 is a flow chart illustrating operation of a user device/UE according to an example implementation. At 810, a UE may use a standard set of MPR values, e.g., MPR values that are not selected based on a location of a UE channel bandwidth within the BS channel bandwidth, since the UE channel bandwidth is the same as the BS channel bandwidth. At this point, the UE may not know whether its UE channel BW is narrower than the BS channel BW or may not have all the parameters it may need to make this determination (such as of BW part for UE/UE channel BW, and BS channel BW). At 816, the BS may provide various information to the UE, e.g., via system information (SIB) or via UE-specific information (such as during initial access or random access procedure), including information indicating the channel edges of the BS channel BW and the edges of the UE channel BW, and the UE RB allocation. At 812, the BS may configure (e.g., send control information/signals to the UE indicating this information) a BW part (or UE RB allocation within a UE channel BW) for the UE. At 814, the UE may determine that its UE channel BW or UE RB allocation is less than the BS channel BW (indicating to the UE that the modified set of MPR parameters may be used by the UE), and then uses the modified MPR values to determine a MPR value (of the modified set of MPR parameters) for UL transmission, e.g., based on a size of the UE RB allocation, the modulation rate/scheme to be used, and the distance from the UE RB allocation (e.g., a center or an edge of the UE RB allocation) from an edge or both edges of the BS channel BW. After determining a MPR value, the UE may then adjust its maximum transmission power by the MPR value (e.g., reduce the maximum transmission power) to obtain a MPR-adjusted maximum transmission power. Thereafter, the UE may control its transmission power, e.g., based on received power control commands from the BS, within a range up to the MPR-adjusted maximum transmission power.

Figure 9A:
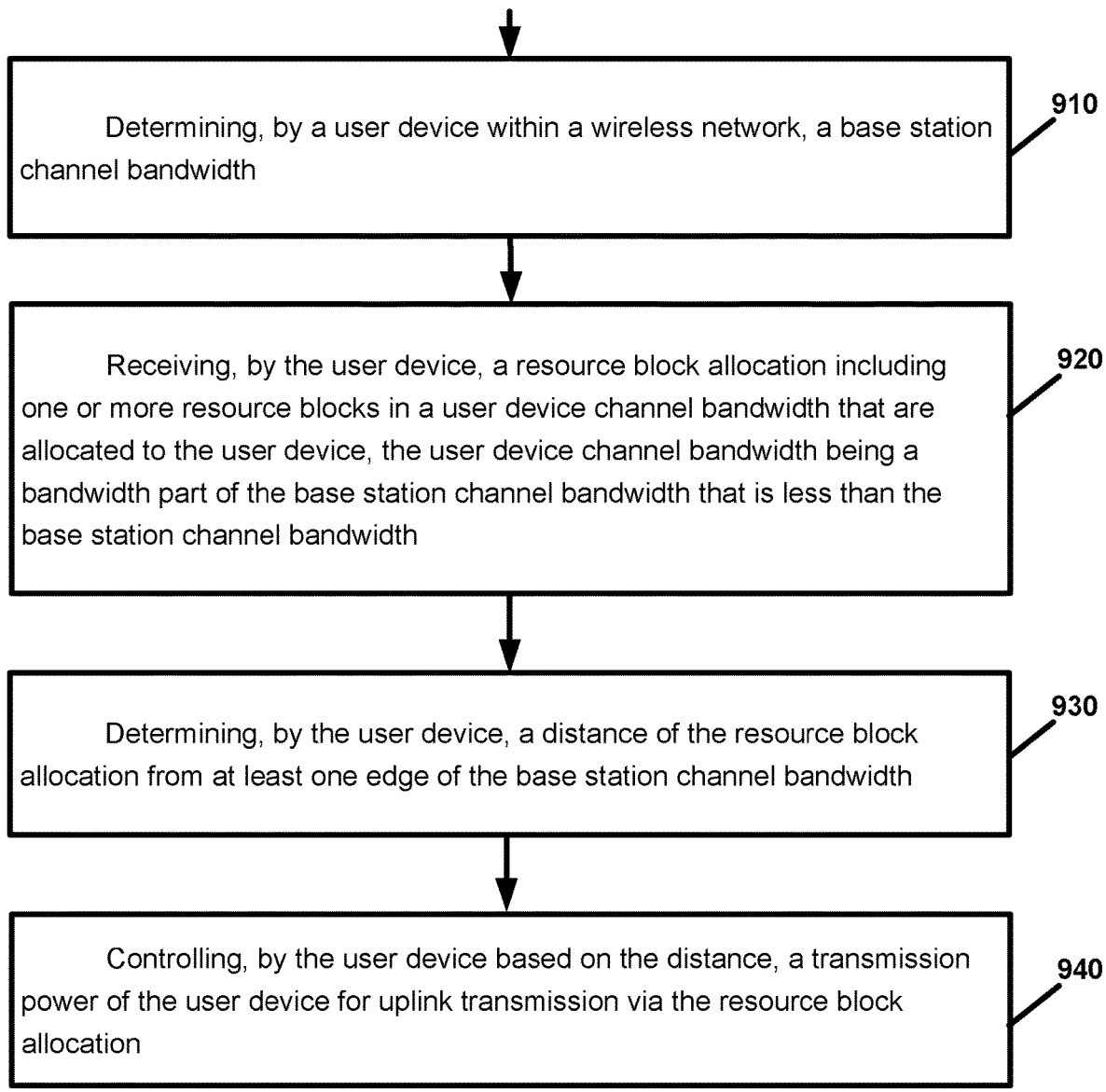
FIG. 9A is a flow chart illustrating operation of a user device (UE) according to an example implementation.

Example 1: FIG. 9A is a flow chart illustrating operation of a user device (UE) according to an example implementation. Operation 910 includes determining, by a user device within a wireless network, a base station channel bandwidth. Operation 920 includes receiving, by the user device, a resource block allocation including one or more resource blocks in a user device channel bandwidth that are allocated to the user device, the user device channel bandwidth being a bandwidth part of the base station channel bandwidth that is less than the base station channel bandwidth. Operation 930 includes determining, by the user device, a distance of the resource block allocation from at least one edge of the base station channel bandwidth. And, operation 940 includes controlling, by the user device based on the distance, a transmission power of the user device for uplink transmission via the resource block allocation.

Example 2: According to an example implementation of the method of example 1, wherein the controlling comprises: controlling, by the user device based on the distance, a maximum transmission power of the user device for uplink transmission via the resource block allocation.

Example 3: According to an example implementation of the method of any of examples 1-2, wherein the controlling comprises: determining, by the user device based on the distance, a maximum power reduction value; determining, by the user device based on the maximum power reduction value, a maximum transmission power; and controlling, by the user device based on signals received from a base station, a transmission power of the user device for uplink transmission via the resource block allocation within a power range up to the maximum transmission power.

Example 4: According to an example implementation of the method of any of examples 1-3, and further comprising: determining, by the user device, a modulation rate for uplink transmission via the resource block allocation; wherein the controlling comprises: determining, by the user device based on the distance and the modulation rate, a maximum power reduction value; determining, by the user device based on the maximum power reduction value, a maximum transmission power; and controlling, by the user device based on signals received from a base station, a transmission power of the user device for uplink transmission via the resource block allocation within a power range up to the maximum transmission power.

Example 5: According to an example implementation of the method of any of examples 1-4, wherein the controlling comprises performing the following for at least one modulation rate used for transmission by the user device: selecting, by the user device based on the distance, a maximum power reduction value as either: 1) a first maximum power reduction value if the distance of the resource block allocation from at least one edge of the base station channel bandwidth is greater than or equal to a threshold, or 2) a second maximum power reduction value if the distance of the resource block allocation from at least one edge of the base station channel bandwidth is less than the threshold; determining a maximum transmission power based on the selected maximum power reduction value; and controlling, by the user device, the transmission power of the user device for uplink transmission within a power range that is less than or equal to the maximum transmission power.

Example 6: According to an example implementation of the method of any of examples 1-5, wherein the determining, by the user device, a distance of the resource block allocation from at least one edge of the base station channel bandwidth comprises: determining, by the user device, a first distance of the resource block allocation from a first edge of the base station channel bandwidth; and determining, by the user device, a second distance of the resource block allocation from a second edge of the base station channel bandwidth.

Example 7: According to an example implementation of the method of any of examples 1-6, wherein the controlling comprises: selecting a maximum transmission power as a first maximum transmission power for uplink transmission via the resource block allocation if both the first distance and the second distance are each greater than or equal to a threshold; and selecting a maximum transmission power as a second maximum transmission power, which is less than the first maximum transmission power, for uplink transmission via the resource block allocation if the distance of the resource block allocation from at least one edge of the base station channel bandwidth is less than the threshold.

Example 8: An apparatus comprising means for performing a method of any of examples 1-7.

Example 9: An apparatus comprising at least one processor and at least one memory including computer instructions that, when executed by the at least one processor, cause the apparatus to perform a method of any of examples 1-7.

Example 10: An apparatus comprising at least one processor and at least one memory including computer instructions that, when executed by the at least one processor, cause the apparatus to: determine, by a user device within a wireless network, a base station channel bandwidth; receive, by the user device, a resource block allocation including one or more resource blocks in a user device channel bandwidth that are allocated to the user device, the user device channel bandwidth being a bandwidth part of the base station channel bandwidth that is less than the base station channel bandwidth; determine, by the user device, a distance of the resource block allocation from at least one edge of the base station channel bandwidth; and control, by the user device based on the distance, a transmission power of the user device for uplink transmission via the resource block allocation.

Example 11: According to an example implementation of the apparatus of example 10, wherein causing the apparatus to control comprises causing the apparatus to: control, by the user device based on the distance, a maximum transmission power of the user device for uplink transmission via the resource block allocation.

Example 12: According to an example implementation of the apparatus of any of examples 10-11, wherein causing the apparatus to control comprises causing the apparatus to: determine, by the user device based on the distance, a maximum power reduction value; determining, by the user device based on the maximum power reduction value, a maximum transmission power; and control, by the user device based on signals received from a base station, a transmission power of the user device for uplink transmission via the resource block allocation within a power range up to the maximum transmission power.

Example 13: According to an example implementation of the apparatus of any of examples 10-12, and further comprising causing the apparatus to: determine, by the user device, a modulation rate for uplink transmission via the resource block allocation; wherein causing the apparatus to control comprises causing the apparatus to: determine, by the user device based on the distance and the modulation rate, a maximum power reduction value; determine, by the user device based on the maximum power reduction value, a maximum transmission power; and control, by the user device based on signals received from a base station, a transmission power of the user device for uplink transmission via the resource block allocation within a power range up to the maximum transmission power.

Example 14: According to an example implementation of the apparatus of any of examples 10-13, wherein causing the apparatus to control comprises causing the apparatus to perform the following for at least one modulation rate used for transmission by the user device: select, by the user device based on the distance, a maximum power reduction value as either: 1) a first maximum power reduction value if the distance of the resource block allocation from at least one edge of the base station channel bandwidth is greater than or equal to a threshold, or 2) a second maximum power reduction value if the distance of the resource block allocation from at least one edge of the base station channel bandwidth is less than the threshold; determine a maximum transmission power based on the selected maximum power reduction value; and control, by the user device, the transmission power of the user device for uplink transmission within a power range that is less than or equal to the maximum transmission power.

Example 15: According to an example implementation of the method of any of examples 10-14, wherein causing the apparatus to determine, by the user device, a distance of the resource block allocation from at least one edge of the base station channel bandwidth comprises causing the apparatus to: determine, by the user device, a first distance of the resource block allocation from a first edge of the base station channel bandwidth; and determine, by the user device, a second distance of the resource block allocation from a second edge of the base station channel bandwidth.

Example 16: According to an example implementation of the apparatus of any of examples 10-15, wherein causing the apparatus to control comprises causing the apparatus to: select a maximum transmission power as a first maximum transmission power for uplink transmission via the resource block allocation if both the first distance and the second distance are each greater than or equal to a threshold; and select a maximum transmission power as a second maximum transmission power, which is less than the first maximum transmission power, for uplink transmission via the resource block allocation if the distance of the resource block allocation from at least one edge of the base station channel bandwidth is less than the threshold.

Figure 9B:
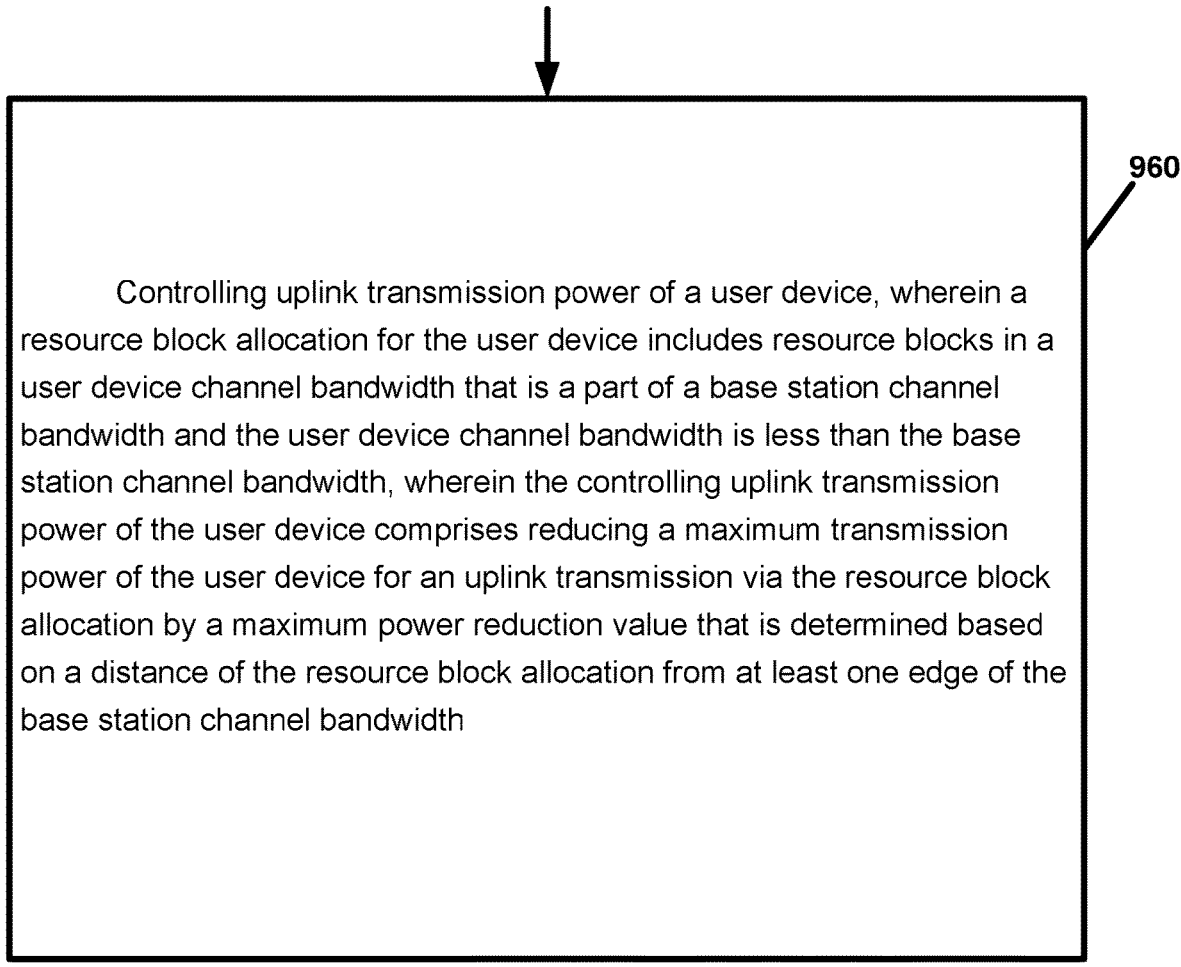
FIG. 9B is a flow chart illustrating operation of a user device (UE) according to an example implementation.

Example 17: FIG. 9B is a flow chart illustrating operation of a user device (UE) according to an example implementation. Operation 960 includes controlling uplink transmission power of a user device, wherein a resource block allocation for the user device includes resource blocks in a user device channel bandwidth that is a part of a base station channel bandwidth and the user device channel bandwidth is less than the base station channel bandwidth, wherein the controlling uplink transmission power of the user device comprises reducing a maximum transmission power of the user device for an uplink transmission via the resource block allocation by a maximum power reduction value that is determined based on a distance of the resource block allocation from at least one edge of the base station channel bandwidth.

Example 18: According to an example implementation of the method of example 17, wherein the controlling comprises: determining, by the user device, a distance of the resource block allocation from at least one edge of the base station channel bandwidth; selecting, by the user device based on the distance, a maximum power reduction value as either: 1) a first maximum power reduction value if the distance of the resource block allocation from at least one edge of the base station channel bandwidth is greater than or equal to a threshold, or 2) a second maximum power reduction value if the distance of the resource block allocation from at least one edge of the base station channel bandwidth is less than the threshold; determining a maximum transmission power based on the selected maximum power reduction value; and controlling, by the user device, the transmission power of the user device for uplink transmission within a power range that is less than or equal to the maximum transmission power.

Example 19: An apparatus comprising a computer program product including a non-transitory computer-readable storage medium and storing executable code that, when executed by at least one data processing apparatus, is configured to cause the at least one data processing apparatus to perform a method of any of examples 1-7 and 17-18.

Example 20: An apparatus comprising means for performing a method of any of examples 17-18.

Example 21: An apparatus comprising at least one processor and at least one memory including computer instructions that, when executed by the at least one processor, cause the apparatus to perform a method of any of examples 17-18.

Example 22: An apparatus comprising a computer program product including a non-transitory computer-readable storage medium and storing executable code that, when executed by at least one data processing apparatus, is configured to cause the at least one data processing apparatus to perform a method of any of examples 17-18.

Example 23: An apparatus comprising at least one processor and at least one memory including computer instructions that, when executed by the at least one processor, cause the apparatus to: control uplink transmission power of a user device, wherein a resource block allocation for the user device includes resource blocks in a user device channel bandwidth that is a part of a base station channel bandwidth and the user device channel bandwidth is less than the base station channel bandwidth, wherein causing the apparatus to control comprises causing the apparatus to control uplink transmission power of the user device comprises reducing a maximum transmission power of the user device for an uplink transmission via the resource block allocation by a maximum power reduction value that is determined based on a distance of the resource block allocation from at least one edge of the base station channel bandwidth.

Example 24: According to an example implementation of the method of example 23, wherein causing the apparatus to control comprises causing the apparatus to determine, by the user device, a distance of the resource block allocation from at least one edge of the base station channel bandwidth; select, by the user device based on the distance, a maximum power reduction value as either: 1) a first maximum power reduction value if the distance of the resource block allocation from at least one edge of the base station channel bandwidth is greater than or equal to a threshold, or 2) a second maximum power reduction value if the distance of the resource block allocation from at least one edge of the base station channel bandwidth is less than the threshold; determine a maximum transmission power based on the selected maximum power reduction value; and controlling, by the user device, the transmission power of the user device for uplink transmission within a power range that is less than or equal to the maximum transmission power.

Figure 10:
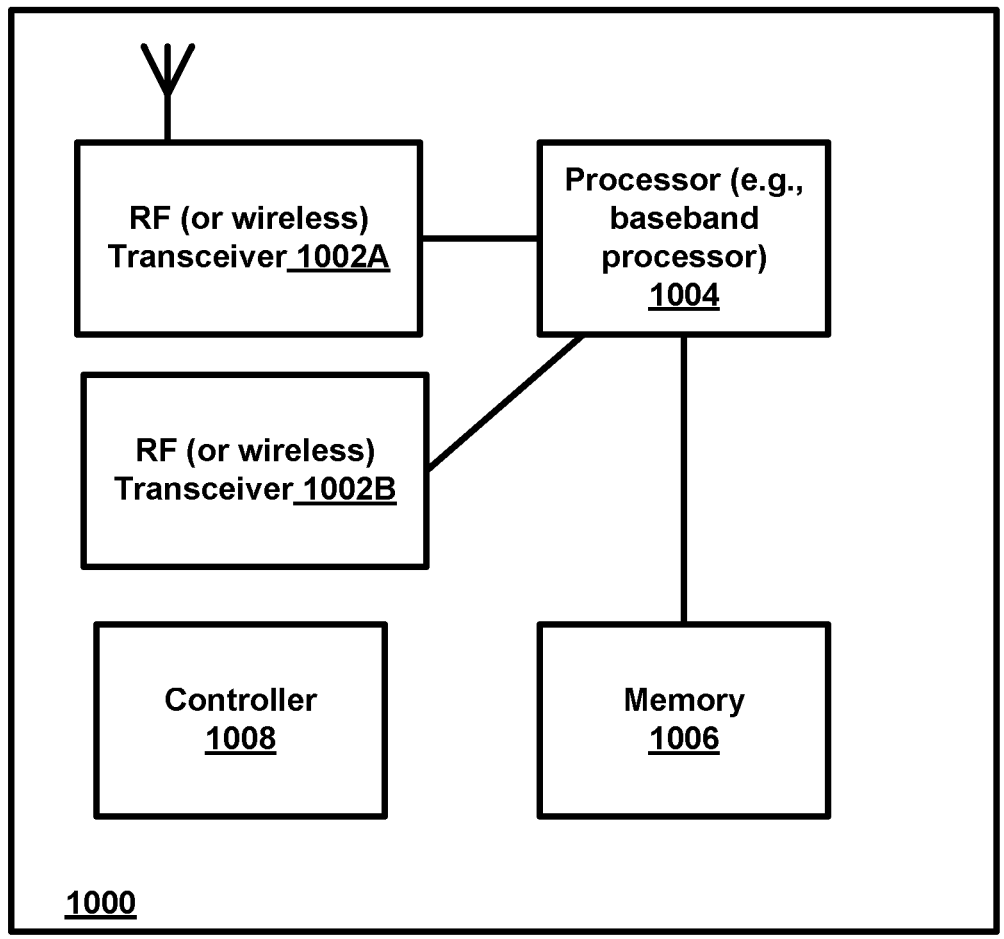
FIG. 10 is a block diagram of a node or wireless station (e.g., base station/access point or mobile station/user device) according to an example implementation.

FIG. 10 is a block diagram of a wireless station (e.g., AP, BS, relay node, eNB, UE or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 10, a controller (or processor) 1008 may execute software and instructions, and may provide overall control for the station 1000, and may provide control for other systems not shown in FIG. 10, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations may be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

ACLR Adjacent Channel Leakage Ratio
BPSK Binary Phase Shift Keying
CA Carrier Aggregation
CP-OFDM Cyclic Prefix Orthogonal Frequency Multiplexing
DFT-S Discrete Fourier Transform Spreading
eMTC enhanced Machine Type Communications
EVM Error Vector Magnitude
LCRB Length of contiguous resource block allocation
LCRBmax Maximum length of contiguous resource block allocation for a given channel bandwidth
LTE Long Term Evolution
MPR Maximum Power Reduction
NB-IoT Narrowband Internet of Things
NR New Radio
QAM Quadrature Amplitude Modulation
QPSK Quadrature Phase Shift Keying
RB Resource Block
SEM Spectrum Emission Mask
SIB System Information Block

The invention claimed is:

1. A method of power control for a user device, comprising:
   determining, by a user device within a wireless network, a base station channel bandwidth;
   receiving, by the user device, a resource block allocation including one or more resource blocks in a user device channel bandwidth that are allocated to the user device, the user device channel bandwidth being a bandwidth part of the base station channel bandwidth that is less than the base station channel bandwidth;
   determining, by the user device, a distance of the resource block allocation from at least one edge of the base station channel bandwidth;
   controlling, by the user device based on the distance, a transmission power of the user device for uplink transmission; and
   determining, by the user device, a modulation rate for uplink transmission;
   wherein the controlling comprises:

determining, by the user device based on the distance and the modulation rate, a maximum power reduction value;

determining, by the user device based on the maximum power reduction value, a maximum transmission power; and controlling, by the user device based on signals received from a base station, a transmission power of the user device for uplink transmission via the resource block allocation within a power range up to the maximum transmission power.

2. The method of claim 1 wherein the controlling comprises:

controlling, by the user device based on the distance, a maximum transmission power of the user device for uplink transmission via the resource block allocation.

3. The method of claim 1 wherein the controlling comprises:

determining, by the user device based on the distance, a maximum power reduction value;

determining, by the user device based on the maximum power reduction value, a maximum transmission power; and controlling, by the user device based on signals received from a base station, a transmission power of the user device for uplink transmission via the resource block allocation within a power range up to the maximum transmission power.

4. The method of claim 1 wherein the controlling comprises performing the following for at least one modulation rate used for transmission by the user device:

selecting, by the user device based on the distance, a maximum power reduction value as either:

1) a first maximum power reduction value if the distance of the resource block allocation from at least one edge of the base station channel bandwidth is greater than or equal to a threshold, or 2) a second maximum power reduction value if the distance of the resource block allocation from at least one edge of the base station channel bandwidth is less than the threshold;

determining a maximum transmission power based on the selected maximum power reduction value; and controlling, by the user device, the transmission power of the user device for uplink transmission within a power range that is less than or equal to the maximum transmission power.

5. The method of claim 1 wherein the determining, by the user device, a distance of the resource block allocation from at least one edge of the base station channel bandwidth comprises:

determining, by the user device, a first distance of the resource block allocation from a first edge of the base station channel bandwidth; and determining, by the user device, a second distance of the resource block allocation from a second edge of the base station channel bandwidth.

6. The method of claim 5 wherein the controlling comprises:

selecting a maximum transmission power as a first maximum transmission power for uplink transmission via the resource block allocation if both the first distance and the second distance are each greater than or equal to a threshold; and selecting a maximum transmission power as a second maximum transmission power, which is less than the first maximum transmission power, for uplink transmission via the resource block allocation if the distance of the resource block allocation from at least one edge of the base station channel bandwidth is less than the threshold.

7. An apparatus comprising at least one processor and at least one memory including computer instructions that, when executed by the at least one processor, cause the apparatus to:

determine, by a user device within a wireless network, a base station channel bandwidth;

receive, by the user device, a resource block allocation including one or more resource blocks in a user device channel bandwidth that are allocated to the user device, the user device channel bandwidth being a bandwidth part of the base station channel bandwidth that is less than the base station channel bandwidth;

determine, by the user device, a distance of the resource block allocation from at least one edge of the base station channel bandwidth;

control, by the user device based on the distance, a transmission power of the user device for uplink transmission; and determine, by the user device, a modulation rate for uplink transmission;

wherein causing the apparatus to control comprises causing the apparatus to:

determine, by the user device based on the distance and the modulation rate, a maximum power reduction value;

determine, by the user device based on the maximum power reduction value, a maximum transmission power; and control, by the user device based on signals received from a base station, a transmission power of the user device for uplink transmission via the resource block allocation within a power range up to the maximum transmission power.

8. The apparatus of claim 7 wherein causing the apparatus to control comprises causing the apparatus to:

control, by the user device based on the distance, a maximum transmission power of the user device for uplink transmission via the resource block allocation.

9. The apparatus of claim 7 wherein causing the apparatus to control comprises causing the apparatus to:

determine, by the user device based on the distance, a maximum power reduction value;

determine, by the user device based on the maximum power reduction value, a maximum transmission power; and control, by the user device based on signals received from a base station, a transmission power of the user device for uplink transmission via the resource block allocation within a power range up to the maximum transmission power.

10. The apparatus of claim 7 wherein causing the apparatus to control comprises causing the apparatus to perform the following for at least one modulation rate used for transmission by the user device:

select, by the user device based on the distance, a maximum power reduction value as either:

1) a first maximum power reduction value if the distance of the resource block allocation from at least one edge of the base station channel bandwidth is greater than or equal to a threshold, or 2) a second maximum power reduction value if the distance of the resource block allocation from at least one edge of the base station channel bandwidth is less than the threshold;

determine a maximum transmission power based on the selected maximum power reduction value; and control, by the user device, the transmission power of the user device for uplink transmission within a power range that is less than or equal to the maximum transmission power.

11. The apparatus of claim 7 wherein causing the apparatus to determine, by the user device, a distance of the resource block allocation from at least one edge of the base station channel bandwidth comprises causing the apparatus to:

determine, by the user device, a first distance of the resource block allocation from a first edge of the base station channel bandwidth; and determine, by the user device, a second distance of the resource block allocation from a second edge of the base station channel bandwidth.

12. The apparatus of claim 7 wherein causing the apparatus to control comprises causing the apparatus to:

select a maximum transmission power as a first maximum transmission power for uplink transmission via the resource block allocation if both the first distance and the second distance are each greater than or equal to a threshold; and select a maximum transmission power as a second maximum transmission power, which is less than the first maximum transmission power, for uplink transmission via the resource block allocation if the distance of the resource block allocation from at least one edge of the base station channel bandwidth is less than the threshold.

13. An apparatus comprising a computer program product including a non-transitory computer-readable storage medium and storing executable code that, when executed by at least one data processing apparatus, is configured to cause the apparatus at least to:

determine a base station channel bandwidth;

receive a resource block allocation including one or more resource blocks in a user device channel bandwidth that are allocated to the apparatus, the user device channel bandwidth being a bandwidth part of the base station channel bandwidth that is less than the base station channel bandwidth;

determine a distance of the resource block allocation from at least one edge of the base station channel bandwidth; and control a transmission power of the apparatus for uplink transmission; and determine a modulation rate for uplink transmission;

wherein causing the apparatus to control comprises causing the apparatus to:

determine, based on the distance and the modulation rate, a maximum power reduction value;

determine, based on the maximum power reduction value, a maximum transmission power; and control, based on signals received from a base station, a transmission power of the user device for uplink transmission via the resource block allocation within a power range up to the maximum transmission power.

* * * * *